United States Patent
Xiang et al.

(10) Patent No.: US 12,498,683 B2
(45) Date of Patent: Dec. 16, 2025

(54) ARTIFICIAL INTELLIGENCE AND ROBOT BASED AUTOMATED MATERIAL SYNTHESIS SYSTEM

(71) Applicant: Hong Kong Quantum AI Lab Limited, Hong Kong (HK)

(72) Inventors: Xiang Xiang, Hong Kong (HK); Yi Luo, Hong Kong (HK); Fei Sun, Hong Kong (HK); Haoyu Zhu, Hong Kong (HK); Guanhua Chen, Hong Kong (HK); Shuguang Chen, Hong Kong (HK)

(73) Assignee: Hong Kong Quantum AI Lab Limited, Hong Kong (HK)

( * ) Notice: Subject to any disclaimer, the term of this patent is extended or adjusted under 35 U.S.C. 154(b) by 69 days.

(21) Appl. No.: 18/639,922

(22) Filed: Apr. 18, 2024

(65) Prior Publication Data
US 2024/0411278 A1    Dec. 12, 2024

Related U.S. Application Data

(60) Provisional application No. 63/506,846, filed on Jun. 8, 2023.

(51) Int. Cl.
*B25J 9/16* (2006.01)
*G05B 13/02* (2006.01)

(52) U.S. Cl.
CPC .......... *G05B 13/027* (2013.01); *B25J 9/1671* (2013.01); *B25J 9/1697* (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 11,209,798 B1 * | 12/2021 | Michalowski | ..... | G05B 19/4097 |
| 11,726,448 B1 * | 8/2023 | Michalowski | ..... | G05B 19/4097 |
| | | | | 700/98 |

(Continued)

FOREIGN PATENT DOCUMENTS

| | | | | |
|---|---|---|---|---|
| CN | 111659483 B | 5/2021 | | |
| WO | WO-2023167912 A1 * | 9/2023 | ....... | G06Q 10/06313 |
| WO | WO-2024170741 A1 * | 8/2024 | ............ | A61B 34/10 |

OTHER PUBLICATIONS

Li J, Tu Y, Liu R, Lu Y, Zhu X. Toward "On-Demand" Materials Synthesis and Scientific Discovery through Intelligent Robots. Adv Sci (Weinh). Feb. 3, 2020;7(7):1901957. doi: 10.1002/advs.201901957. PMID: 32274293; PMCID: PMC7141037. (Year: 2020).*

(Continued)

*Primary Examiner* — Jonathan L Sample
(74) *Attorney, Agent, or Firm* — IDEA Intellectual Limited; Sam T. Yip

(57) ABSTRACT

An artificial intelligence (AI) and robot based automated material synthesis system including an AI model and a robotic system coupled to the AI model for material synthesis is provided. The AI and robot based automated material synthesis system of the present invention is 100% automated, thereby minimizing human intervention during the material synthesis experiments not only minimizing risks of accident and costs due to the labor-intensive nature of manual experimentation, but it also significantly increases the accuracy in the target material structure synthesized, and the synthesis could also be conducted in a highly reproducible manner with a much higher efficiency. The system also has its own mapping rules between materials properties and structures, for recommending materials based on desired properties, learnt from past experimental analysis results both qualitatively and quantitatively, therefore it can operate (Continued)

without being bound by the constraints of predefined structure-property relationships known by humans.

11 Claims, 5 Drawing Sheets

(56) References Cited

U.S. PATENT DOCUMENTS

| | | | | |
|---|---|---|---|---|
| 2015/0055085 | A1* | 2/2015 | Fonte | G02C 7/024 |
| | | | | 700/98 |
| 2016/0125335 | A1* | 5/2016 | Cheng | G06Q 10/0639 |
| | | | | 705/7.23 |
| 2018/0276590 | A1* | 9/2018 | Kubo | G06Q 10/06316 |
| 2023/0394742 | A1* | 12/2023 | Skusa | G06T 7/0002 |

OTHER PUBLICATIONS

Benjamin Burger et al., "A Mobile Robotic Chemist," Nature, 2020, vol. 583 (7815), p. 237-241.
Jiagen Li et al., "AIR-Chem: Authentic Intelligent Robotics for Chemistry," The Journal of Physical Chemistry A, 2018, vol. 122, p. 9142-9148.
Connor W. Coley et al., "A robotic platform for flow synthesis of organic compounds informed by AI planning." Science, 2019, vol. 365 (6453), p. 1-9.

* cited by examiner

ARTIFICIAL INTELLIGENCE AND ROBOT BASED AUTOMATED MATERIAL SYNTHESIS SYSTEM

CROSS-REFERENCE TO RELATED APPLICATIONS

The present application claims priority from the U.S. provisional patent application Ser. No. 63/506,846 filed 8 Jun. 2023, and the disclosures of which are incorporated herein by reference in their entirety.

FIELD OF THE INVENTION

The present invention generally relates to a material synthesis system. More specifically, the present invention relates to an artificial intelligence (AI) and robot based automated material synthesis system.

BACKGROUND OF THE INVENTION

Material synthesis has been a field of paramount importance, attracting countless expert and scientists to conduct countless investigations, studies and experimentation.

Through material synthesis experiments, new materials may be discovered possessing unique properties and functionalities, which may have profound potentials and impacts in various fields of application, such as electronics, medicine, energy storage, and green technologies. This may in turn open up opportunities for scientific advancement and innovation.

Another significant importance of material synthesis experiments is allowing researchers to explore and hence tailor properties of various materials to meet specific requirements. By studying and controlling factors such as morphology, composition and processing conditions, and understanding the structure-property relationships of materials, materials can be engineered to achieve desired characteristics including mechanical strength, heat and electrical conductivity, optical properties and biocompatibility. This is crucial for developing optimum materials for various applications, ranging from lightweight and highly durable alloys for aerospace, to biocompatible polymers for medical transplants, green and sustainable building materials for architecture and pollution remediation, and so on, bringing not only technological and scientific advancements, but also even addressing societal challenges.

However, manual experimentations on material synthesis may have drawbacks. Human errors in experimentation are often inevitable, which may cause inaccuracies and irreproducibility in material synthesis experiments, which may involve complex synthesis steps, and which a slight variation in conditions or measurements could significantly alter the properties of the final product. Also, many material synthesis processes may involve extreme synthesis conditions such as extreme temperatures and high temperatures, and may also involve highly hazardous chemicals and substances, which could pose significant risks to the operators. The complexity of the material synthesis steps may also render the synthesis processes very labor-intensive and time consuming, leading to considerable costs, both economically and in terms of time consumption.

Therefore, there is a need to a safe and automated material synthesis system to minimize human intervention and involvement in material synthesis, thereby optimizing efficiency and minimizing costs and risks. The present invention addresses this need.

SUMMARY OF THE INVENTION

In accordance with a first aspect of the present invention, an artificial intelligence (AI) and robot based automated material synthesis system is provided herewith, which includes an AI model, and a robotic system coupled with the AI model for synthesizing the target material structure based on the generated vector matrix. The AI model includes a generative network and a supervisor network, wherein the generative network is coupled to the supervisor network. The generative network includes an encoder and a decoder coupled to the encoder. The encoder receives an original vector matrix of a target material structure and compresses the original vector matrix to obtain a compressed latent vector, the compressed latent vector is then passed to the decoder, and the decoder generates a generated vector matrix of a target material structure based on the compressed latent vector. The generative network further includes a reconstruction loss function. The supervisor network includes a property loss function. The generative network performs a first computation by inputting the original vector matrix and the generated vector matrix into the reconstruction loss function to obtain a first result. The supervisor network performs a second computation by inputting at least one element property value from the compressed latent vector and a default element property value into the property loss function to obtain a second result, and the supervisor network then returns the second result to the generative network, and the generative network combines/sums the first and second results to obtain a third result, such that generative network is trained by minimizing the third result. The robotic system coupled with the AI model for synthesizing the target material structure based on the generated vector matrix.

In accordance with one embodiment of the present invention, the robotic system includes a processor, at least one robotic arm device, at least one CNC experimental device, at least one vision module, and a mobile base. Based on the generated vector matrix from the AI model, the processor controls the at least one robotic arm device, the at least one CNC experimental device, the at least one vision module, and the mobile base, so as to synthesize the target material structure.

In accordance with one embodiment of the present invention, the processor is coupled to the robotic arms, the at least one CNC experimental device, the vision module, and the mobile base. The at least one robotic arm device is mounted on the mobile base. The at least one CNC experimental device is coupled to the processor. The at least one vision module is disposed at an end of the robotic arm.

In accordance with one embodiment of the present invention, the vision module further includes an imaging capturing device and an imaging recognition device. The imaging capturing device captures the image information of an environment where the robotic arm is located. The imaging recognition device is coupled to the imaging capturing device and receives the image information, wherein the imaging recognition device identifying at least one object in the captured image information.

In accordance with one embodiment of the present invention, the imaging capturing device further includes a 3D camera.

In accordance with one embodiment of the present invention, the processor controls a motion of the mobile base.

In accordance with one embodiment of the present invention, each of the robotic arm devices includes a robotic arm, a micro controller, and a display. The robotic arm is mechanically coupled to the mobile base. The micro controller is coupled to the robotic arm and the processor, wherein the micro controller determines a working route of the robotic arm. The display is disposed at the robotic arm, wherein the display is capable of showing a working status of the robotic arm device.

In accordance with one embodiment of the present invention, the first computation includes a step of squaring a difference between the original vector matrix and the generated vector matrix.

In accordance with one embodiment of the present invention, the second computation includes a step of squaring a difference between the default element property value and an element property value from the compressed latent vector.

A method of synthesizing target material structures using the AI and robot based automated material synthesis system is also provided herewith. The method comprises inputting an original vector matrix of a target material structure to the AI and robot based automated material synthesis system, the encoder then receiving an original vector matrix of the target material structure and compressing the original vector matrix to obtain a compressed latent vector. The compressed latent vector is then passed to the decoder for generating a generated vector matrix of a reconstructed material structure based on the compressed latent vector. The generative network performs a first computation by inputting the original vector matrix and the generated vector matrix into the reconstruction loss function to obtain a first result; and the supervisor network performs second computation by inputting at least one element property value from the compressed latent vector and a default element property value into the property loss function to obtain a second result, wherein the supervisor network returns the second result to the generative network, and the generative network then combines and/or sums the first and second results to obtain a third result, such that generative network is trained by minimizing the third result. The generated vector matrix is further passed on to the processor in the robotic system, which then synthesizes the target material structure by controlling the at least one robotic arm device, the at least one CNC experimental device, the at least one vision module and the mobile base for performing material synthesis based on the generated vector matrix.

BRIEF DESCRIPTION OF THE DRAWINGS

Embodiments of the invention are described in more details hereinafter with reference to the drawings, in which.

DETAILED DESCRIPTION

The present invention is developed in view of the need of a safe and automated material synthesis system to minimize human intervention and involvement in material synthesis. The AI and robot based automated material synthesis system of the present invention is 100% automated, meaning that human intervention during the experiments is not needed, hence preventing any potential operational errors or injuries, thereby minimizing human risks and optimizing efficiency and operation consistency.

The AI model has its own rules, i.e., the mapping rules between materials properties and structures, for recommending materials based on desired properties, learnt from past experimental analysis results both qualitatively and quantitatively. The AI model could therefore overcome the predefined barriers of human experts' knowledge and find more precise relationships between the structures and the properties of materials.

Therefore, by integrating the AI model and the robot system, the AI and robot based automated material synthesis system not only minimizes risks of accident and costs due to the labor-intensive nature of manual experimentation by achieving full automation, but it also significantly increases the accuracy in the target material structure synthesized, and the synthesis could also be conducted in a highly reproducible manner with a much higher efficiency, also without being bound by the constraints of predefined structure-property relationships known by humans.

In the following description, an AI and robot based automated material synthesis system and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
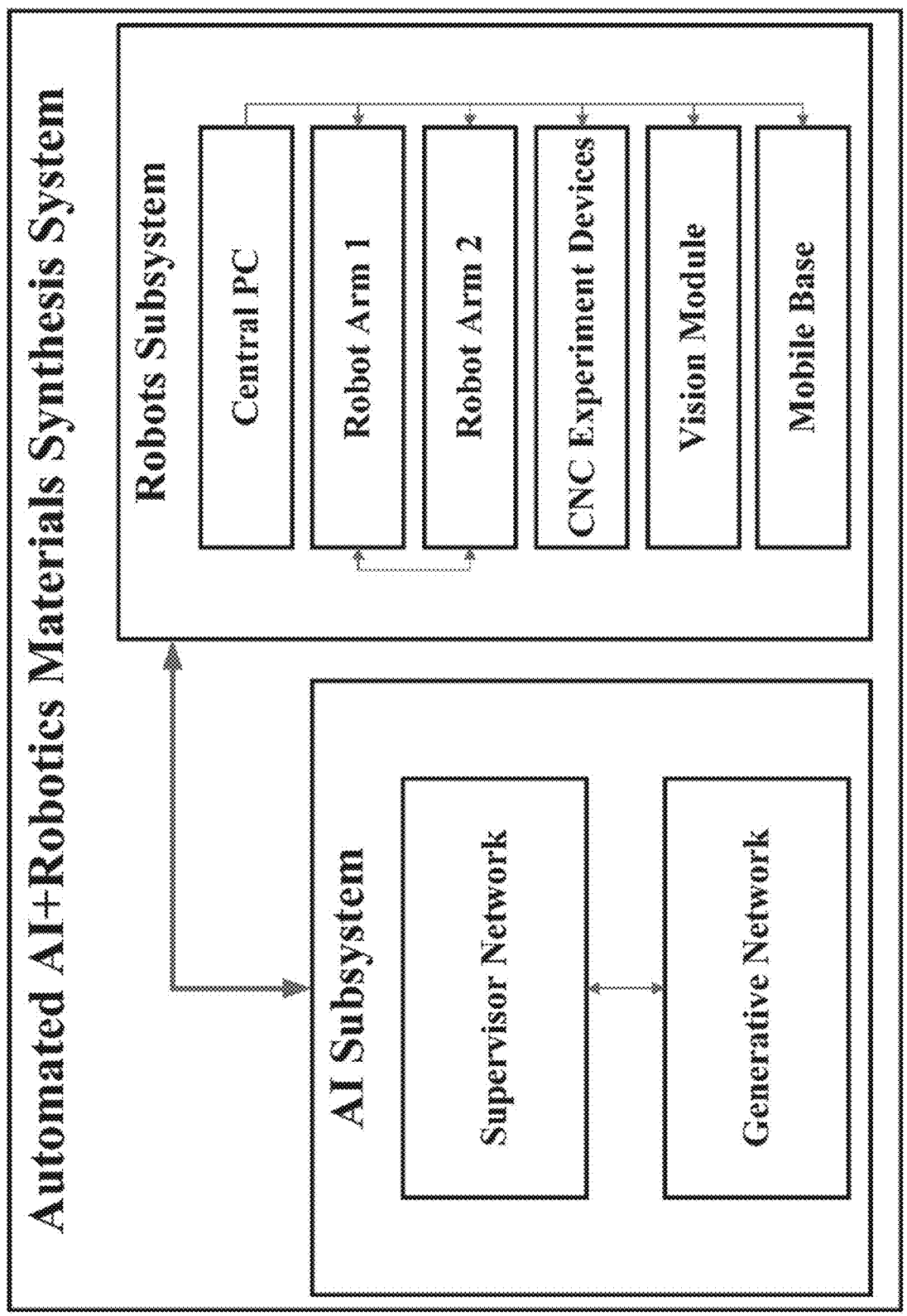
FIG. 1 is a schematic diagram illustrating the overall structure of the AI and robot based automated material synthesis system of the present invention.

Referring to FIG. 1, the whole AI and robot based automated material synthesis system includes two parts: (1) AI Model and (2) Robotic system.

1) AI Model

Figure 2:
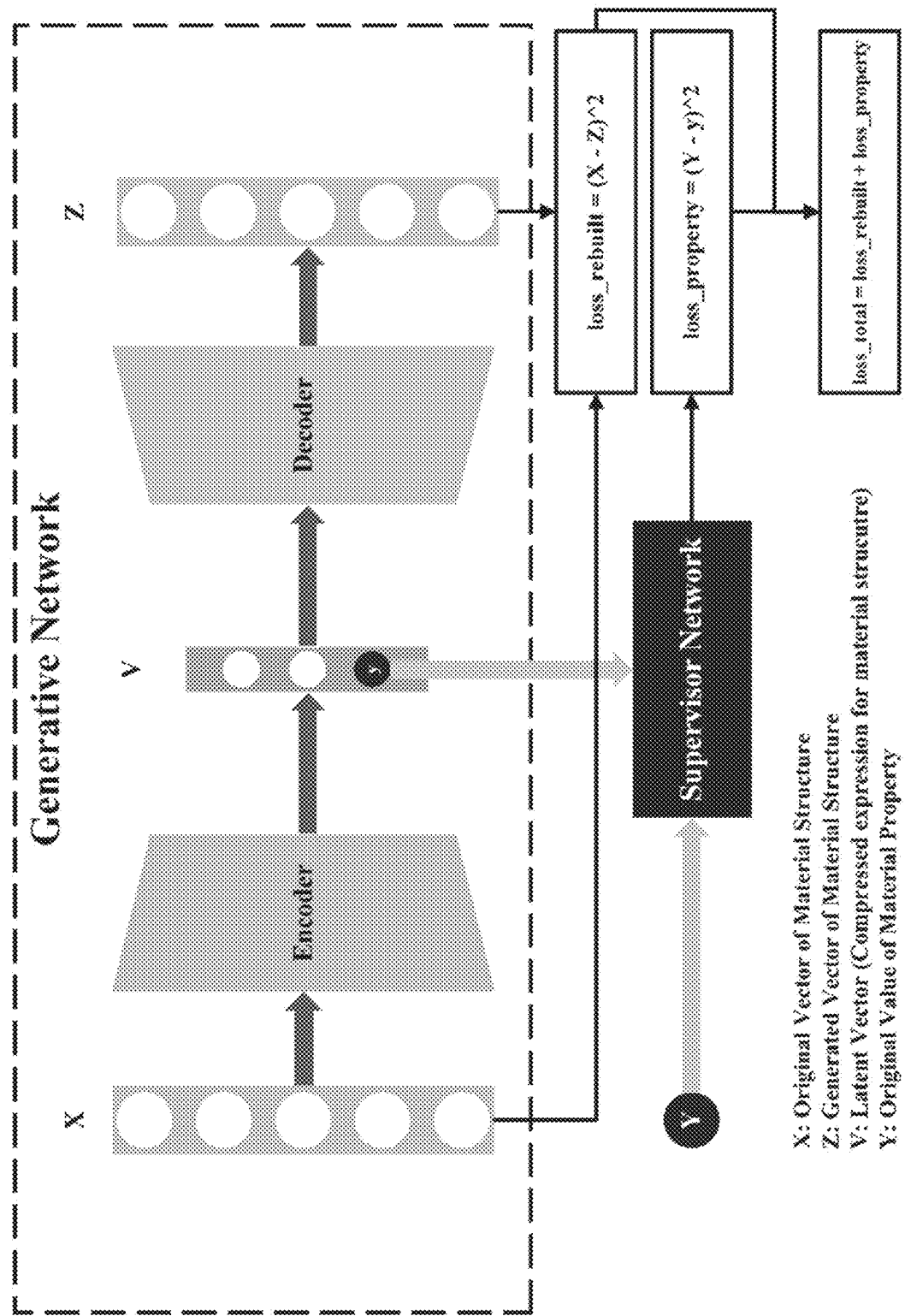
FIG. 2 illustrates in schematics the structure of the AI model employed in the AI and robot based automated material synthesis system.
Figure 3:
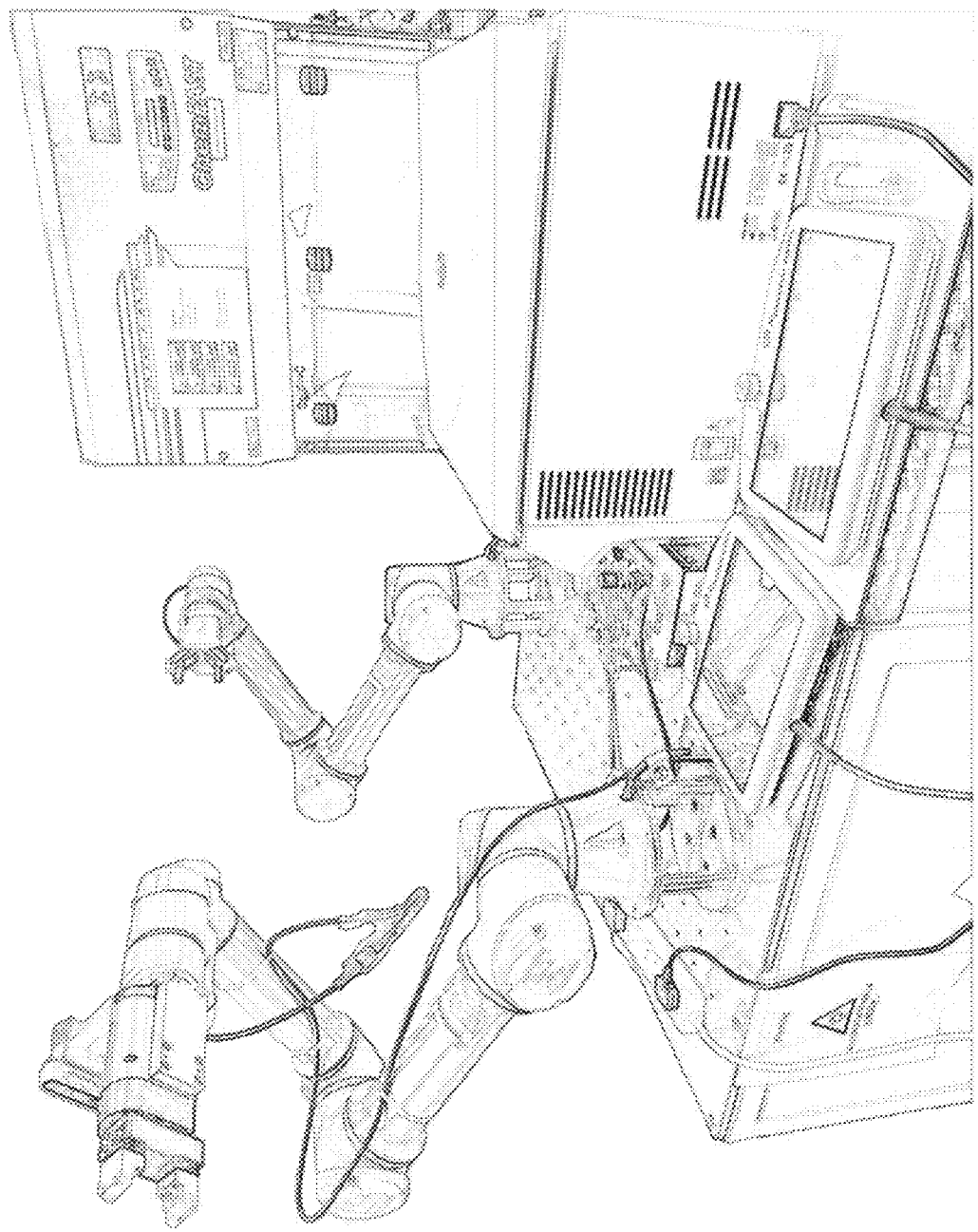
FIG. 3 shows a photograph of two robot arms of the robotic system in the AI and robot based automated material synthesis system.
Figure 4:
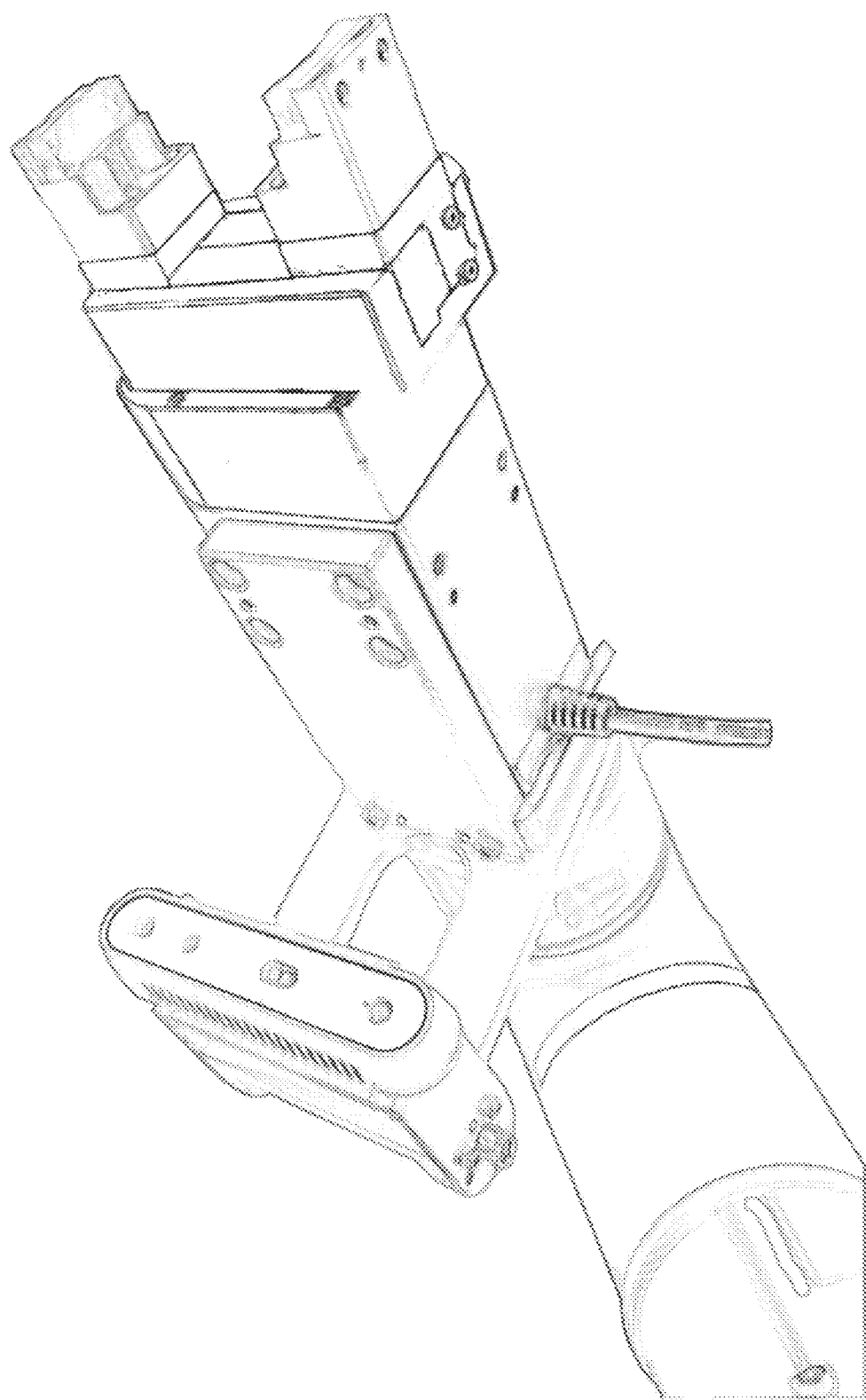
FIG. 4 is a close-up photograph of an end of the robot arm in the AI and robot based automated material synthesis system.
Figure 5:
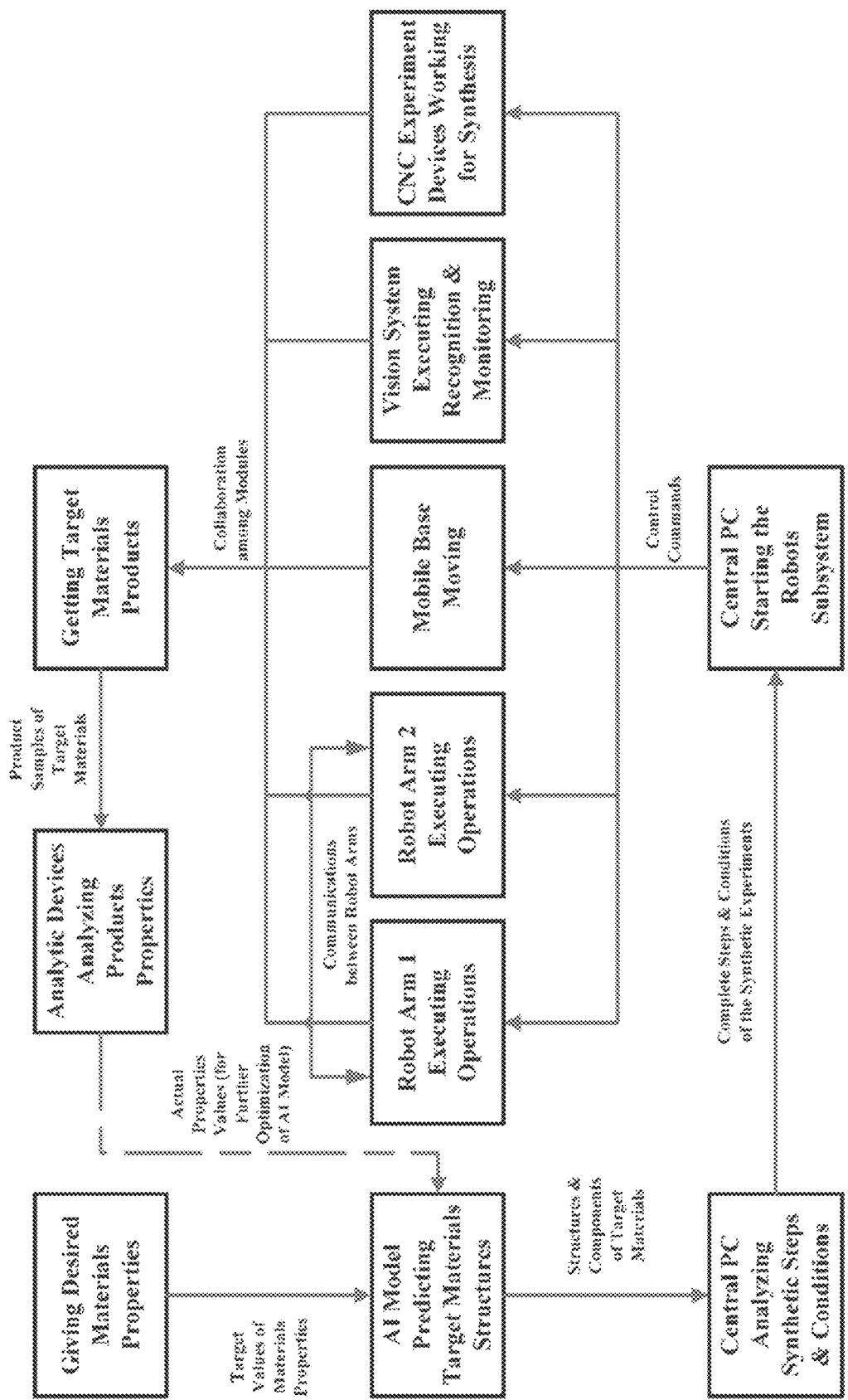
FIG. 5 is a schematic diagram showing the pipeline of the operation of the AI and robot based automated material synthesis system.

Referring to FIGS. 1 and 2, the AI Model includes a generative network and a supervisor network. The following paragraphs will describe the aforesaid elements.

Generative Network

Referring to FIG. 2, the generative network contains two parts: an encoder and a decoder. The input is in the form of a vector, with each entry of it standing for the amount (i.e., number of atoms) of an element in a decided order. The encoder maps the input vector "X" into the latent vector "V", which can be regarded as the compressed form of "X". The encoder can be in many forms like fully connected neural networks. The decoder maps the latent vector "V" into the generated vector "Z", which can be regarded as the rebuilt form of "X". The decoder can be in many forms like fully connected neural networks. So generally, the encoder is used to compress the vector of material structure into a much more concise form and then the decoder tries to regenerate the original vector of material structure from the compressed vector. The encoder and decoder are trained to minimize two losses. One is the rebuilding loss: "loss_rebuilt", which is calculated as the square of Euclidean distance of "X" and "Z".

Supervisor Network

For one entry in latent vector "V", which here is referred to as "y", and it is regarded as the predicted value of material property. To achieve this, the supervisor network is fed with predicted value of material property, comparing it with the actual value of material property, which is a scalar value and here is referred to "Y", and calculate the loss of property difference: "loss_property", which is the other one loss needed to minimize during the training process of the generative network.

The supervisor network can be a simple module calculating the square of difference between "Y" and "y". Therefore, the generative network would be trained to achieve the goal that minimize the total loss: "loss_total", which is the sum of the rebuilding loss and the loss of property difference. By doing so, the generative network could rebuild the material structure well and give a precise prediction of the property value of the material. One thing worth notice is that in latent vector "V", the other entries except for "y" contains other key information about the structure and components of the material, and during the training process, also record the ranges of their values are also recorded.

After the training is completed, the method to use the AI model is that the users set the desired value of the material property, i.e., set the value of "y". As for other entries in "V", they can be generated randomly within their range acquired in the training process. As such, a synthesized vector which contains the desired property value and random entries can be obtained, and then they are fed into the decoder of the generative network to output the material structure which might hold the desired property. Usually in practical use, 3-5 such synthesized vectors can be generated to gain more possibilities to find desired materials.

The current AI model structure and operation mechanism is engineered in such a way that a computer employing such the AI model can simplify operational processes for the robotic system and reduce computer power consumption during the operation. That is, the computational speed for the operation of the robotic system is increased, which is resulted from integrating the provided AI model and the robotic system while optimizing computational efficiency.

(2) Robotic System.

Referring to FIGS. 1 and 2, the robotic system includes a central PC, robot arms 1, 2, CNC experiment devices, a vision module, and a mobile base.

Central PC (Including a Processor)

The central PC acts as the manager of the whole system manipulating all the system resources. It is responsible for communicating with and coordinating each subpart. It also has miscellaneous programs to deal with specific tasks like controlling the CNC experiment devices via serial communication protocol and robot arms via ethernet. The central PC also processes the image data from the vision module for object detection and recognition. The action of the mobile base is also manipulated by the central PC: where to go and when to go.

Robot Arm Device 1

The robot arm device 1 consists of 3 parts: an arm, a control box with cables and a tablet for showing the real-time working status of the arm and direct manual control. The robot arm device 1 is loaded on the mobile base and it is equipped with a powerful and flexible finger so that it could handle with operations like translation, rotation, pressing, grasping, etc. It holds the function of force feedback which is very useful in touch detection and the working route is calculated by the microcomputer of itself. It could establish direct communication with the robot arm 2. Concerning the tasks requiring collaboration of the two robot arm devices, each of them could send or receive signals from the other one via digital IO ports to cooperate.

Robot Arm Device 2

The robot arm device 2 consists of 3 parts: an arm, a control box with cables and a tablet for showing the real-time working status of the arm and direct manual control. The robot arm device 2 is also loaded on the mobile base and it is equipped with a powerful finger with large torque, so it is designed to perform rotating task requiring large torque. It also holds the function of force feedback, and the working route is calculated by the microcomputer of itself. It could communicate directly with the robot arm device 1 via digital IO ports for multi-arm operations.

Vision Module

The vision module consists of hardware part: a 3D camera which is mounted at the end of the robot arm 2, and software part: image processing programs for object detection, recognition and locating.

The mobile base needs the vision module to locate and recognize the target devices or reagents for movement.

The robot arms also need the vision module to locate and recognize the target devices or reagents for moving or operations. They also need the vision module to recognize the readings from the panels of devices to real-time monitor the working condition of these devices.

Concerning the software part, both traditional image processing algorithms and deep learning algorithms are developed to perform the object detection, recognition and locating tasks. For all the tasks, the inputs are the images taken by the camera.

For the recognition task, the output result is the category of the object, i.e., it's an oven, centrifuge, or buttons with different functions.

For the detection task, the output result is the category of the object and its location. The location is in the form of coordinates relative to the robot arms. Originally, the location is under the image coordinates, then being converted to under the camera coordinates and under the robot coordinates. The conversion program is also part of the vision software.

For the locating task, the output is the location of the object.

Mobile Base

The mobile base is a mobile robot that could afford heavy loads, so both the robot arms are loaded on it. The mobile base holds the ability of map building for later route planning. The vision module guides the mobile base for locating. During our development process, different locating methods are tried by QR code and by object locating. For the former one, the QR codes are sticked to key locations, and the mobile base locates itself by scanning the QR codes via the vision module. For the latter one, the vision module is directly utilized to locate the devices. After performance comparison, it is found that the QR code method is more precise and efficient.

(3) Operation Procedures:

Researchers set the values of desired materials properties (e.g., conductivity).

Feed the values in the form of scalar into the AI model, and through the generative module of the AI model, it outputs components of candidates of potential target materials. The output is in the form of a vector, and each entry in it stands for an amount of an element. For example, the vector is set with a length of 5, and the entries stand for lithium, oxygen, iron, phosphorus, and aluminum respectively from left to right. And a vector: [1, 4, 1, 1, 0] can be obtained, so it refers to the $LiFePO_4$ which is also named lithium iron phosphorus.

After getting the components of materials candidates (in the form of a vector), the AI model passes the components to the central PC and an expert-tailored program will automatically analyze and produce the overall steps and conditions of the synthetic experiment.

Then the central PC will start the robotic system and control the robot arm 1, robot arm 2 (both robot arms are loaded on the mobile base), mobile base, CNC experiment devices and vision module according to the experiment steps and conditions from the expert-tailored program. And an example of such synthetic process is explained below:

The central PC controls the peristaltic pump to pump the reagents into the reaction device for fixed volume based on experiment conditions.

The vision module (its camera is attached to the end of the robot arm 2) locates and recognizes the reaction device and always sends the acquired information to the central PC for next-step processing.

Then the mobile base moves to the location of the reaction device.

The robot arm 1 moves to press or rotate the buttons of the reaction device (for those non-CNC type devices) to set up the experimental parameters like heating duration and start the device.

The central PC send commands to the stirring machine (CNC type experimental devices) to set up the experimental parameters like stirring duration and speed, and start the stirring machine.

After the reaction is completed, the products need to be collected.

The vision module locates and recognizes the centrifuge tubes (the container to collect the products here).

The mobile base moves to the location of the centrifuge tubes.

The robot arm 1 moves to grasp the centrifuge tube. After the robot arm 1 hold the centrifuge tube steadily, it sends signal directly via digital IO ports (without through the central PC) to the robot arm 2 to command the robot arm 2 to move to the top of the centrifuge tube and rotate to remove the cap of the centrifuge tube.

After the robot arm 2 removes and holds the cap of the centrifuge tube, it sends signal directly to the robot arm 1 to inform the robot arm 1 to take the centrifuge tube to the next position.

The robot arm 1 puts the centrifuge tube on the electronic balance. Then the central PC sends control commands to the electronic balance to monitor the real-time weight measure, and the central PC also sends control commands to the peristaltic pump to pump out the product liquid into the centrifuge tube from the reaction device.

Once the weight measure from the electronic balance shows that the products of target mass are collected, the central PC would send commands to the peristaltic pump to stop.

The robot arm 1 takes back the centrifuge tube and send signals to the robot arm 2 to recap the centrifuge tube.

The vision module locates the centrifuge (centrifugal machine) and recognizes the panel of it.

The robot arm 1 puts the centrifuge tube on the shelf, and press the button to open the outer lid of the centrifuge.

The robot arm 1 presses the rotating chamber inside the centrifuge, and then sends signals to inform the robot arm 2 to locate on the top of the inner lid of the rotating chamber and rotate to remove the inner lid.

After the robot arm 2 removes and grasps the inner lid steadily, it sends signals to the robot arm 1. Then the robot arm 1 moves to grasp the centrifuge tube and the vision module detects the cells inside the rotating module. The robot arm 1 put the centrifuge tube into a cell.

The robot arm 1 presses the rotating module again and then informs the robot arm 2 to move to the top of the module to recap the inner lid.

Both the robot arm 1 and 2 moves outward, and then the robot arm 1 presses the outer lid to close it.

According to the information from the vision module, the robot arm 1 presses the necessary buttons on the panel of the centrifuge to set up the parameters for the centrifuging. Simultaneously, the vision module monitors the displaying from the screen to ensure the setting up and the status of the centrifuge is correct. If the setting up is incorrect, the vision module would send informing signals to the central PC, and the central PC would send commands to the robot arm 1 to stop the operation and redo it correctly.

After the centrifuging is completed, operations similar to steps 16)-19) are performed to take the centrifuge tube out.

Once again, the robot arm 2 removes the cap of the centrifuge tube and the robot arm 1 moves to pour the liquid out of the centrifuge tube, leaving the solids at the bottom of the centrifuge tube.

The vision module locates the oven and its handle. And the robot arm 1 put the uncapped centrifuge tube on the shelf.

The robot arm 1 moves to rotate the oven handle to open the door of the oven with the robot arm 2 pressing the door to provide additional and necessary torque for opening the door.

The robot arm 1 takes the uncapped centrifuge tube to the chamber of the oven.

The robot arm 1 operates the oven handle to close the oven door.

The vision module locates and recognizes the buttons and the panels of the oven. Then the robot arm 1 presses or rotates the knobs and buttons to set up drying parameters like drying time and temperature. Simultaneously, the vision module monitors the panels in real time to ensure correct setting up.

Once the drying is completed, the system repeats similar processes with steps 24)-27) to take out the centrifuge tube with dried products.

The materials products are analyzed by analytic instruments and the actual properties values are acquired.

The acquired actual properties values are fed into the AI model for fine-tuning to improve its performance on future predictions.

In the aforesaid embodiment, the robotic system can be controlled by a central PC (including processor) to operate a plurality of robotic arm devices, a plurality of CNC experimental devices, and a plurality of vision modules, enabling the material synthesis procedure as described in the aforesaid steps. In other embodiments, the material synthesis procedure can also be achieved using one robotic arm device, one CNC experimental device, and one vision module in conjunction with the aforementioned steps. The invention is not limited to a specific number of robotic arm devices, CNC experimental devices, or vision modules for achieving the aforesaid material synthesis procedure.

The functional units and modules of the AI-based material synthesis system in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. An artificial intelligence (AI) and robot based automated material synthesis system, comprising:
    an AI model comprising a generative network and a supervisor network, wherein the generative network is coupled to the supervisor network; wherein the generative network comprises an encoder and a decoder coupled to the encoder, and the generative network further comprises a reconstruction loss function; and wherein the supervisor network comprises a property loss function; and
    a robotic system coupled with the AI model for synthesizing the target material structure;
    wherein the encoder receives an original vector matrix of a target material structure and compresses the original vector matrix to obtain a compressed latent vector, the compressed latent vector is passed to the decoder, and the decoder generates a generated vector matrix of a reconstructed material structure based on the compressed latent vector;
    wherein the generative network performs a first computation by inputting the original vector matrix and the generated vector matrix into the reconstruction loss function to obtain a first result;
    wherein the supervisor network performs a second computation by inputting at least one element property value from the compressed latent vector and a default element property value into the property loss function to obtain a second result, and the supervisor network returns the second result to the generative network, and the generative network then combines and/or sums the first and second results to obtain a third result, such that generative network is trained by minimizing the third result.

2. The AI and robot based automated material synthesis system of claim 1, wherein the robotic system comprises a processor, at least one robotic arm device, at least one CNC experimental device, at least one vision module, and a mobile base;
    wherein the processor is coupled to the robotic arms, the at least one CNC experimental device, the vision module, and the mobile base; and
    wherein the processor controls the at least one robotic arm device, the at least one CNC experimental device, the at least one vision module and the mobile base based on the generated vector matrix from the AT model to synthesize the target material structure.

3. The AI and robot based automated material synthesis system of claim 2, wherein:
    the at least one robotic arm device is mounted on the mobile base;
    the at least one CNC experimental device is coupled to the processor; and
    the at least one vision module is attached at the end of the robotic arm.

4. The AI and robot based automated material synthesis system of claim 3, wherein the vision module further comprises:
    an imaging capturing device capturing the image information of the surrounding environment where the robotic arm is located; and
    an imaging recognition device coupled to the imaging capturing device for receiving the image information from the imaging capturing device, and identifying at least one object in the image information.

5. The AI and robot based automated material synthesis system of claim 4, wherein the imaging capturing device further comprises a 3D camera.

6. The AI and robot based automated material synthesis system of claim 2, wherein the processor controls the motion of the mobile base.

7. The AI and robot based automated material synthesis system of claim 2, wherein each of the robotic arm devices comprises:
    a robotic arm mounted on the mobile base;
    a micro controller coupled to the robotic arm and the processor, wherein the micro controller determines a working route of the robotic arm; and
    a display disposed at the robotic arm, wherein the display is capable of showing a working status of the robotic arm device.

8. The AI and robot based automated material synthesis system of claim 1, wherein the first computation comprises a step of squaring a difference between the original vector matrix and the generated vector matrix.

9. The AI and robot based automated material synthesis system of claim 1, wherein the second computation comprises a step of squaring a difference between the default element property value and an element property value from the compressed latent vector.

10. The AI and robot based automated material synthesis system of claim 1, wherein the original vector matrix comprises a plurality of entries, each of the entries representing atom numbers of the material structure.

11. A method of synthesizing a target material structure using the AI and robot based automated material synthesis system of claim 1, comprising:

inputting an original vector matrix of a target material structure to the AI and robot based automated material synthesis system to the generative network comprising an encoder and a decoder;

receiving, by the encoder, an original vector matrix of a target material structure and compressing the original vector matrix to obtain a compressed latent vector;

passing the compressed latent vector to the decoder for generating a generated vector matrix of a reconstructed material structure based on the compressed latent vector;

performing, by the generative network, a first computation by inputting the original vector matrix and the generated vector matrix into the reconstruction loss function to obtain a first result;

performing, by the supervisor network, a second computation by inputting at least one element property value from the compressed latent vector and a default element property value into the property loss function to obtain a second result, wherein the supervisor network returns the second result to the generative network, and the generative network then combines and/or sums the first and second results to obtain a third result, such that generative network is trained by minimizing the third result;

passing the generated vector matrix to the processor in the robotic system; and synthesizing, by the robotic system, the target material structure by controlling the at least one robotic arm device, the at least one CNC experimental device, the at least one vision module and the mobile base for performing material synthesis based on the generated vector matrix.

* * * * *